United States Patent
Cheng

(10) Patent No.: US 10,739,654 B2
(45) Date of Patent: Aug. 11, 2020

(54) ARRAY SUBSTRATE, DISPLAY PANEL, AND METHOD OF CONTROLLING DISPLAY PANEL

(71) Applicant: WUHAN CHINA STAR OPTOELECTRONICS TECHNOLOGY CO., LTD., Wuhan, Hubei (CN)

(72) Inventor: Wei Cheng, Hubei (CN)

(73) Assignee: Wuhan China Star Optoelectronics Technology Co., Ltd., Wuhan, Hubei (CN)

(*) Notice: Subject to any disclaimer, the term of this patent is extended or adjusted under 35 U.S.C. 154(b) by 0 days.

(21) Appl. No.: 16/476,089

(22) PCT Filed: Feb. 21, 2019

(86) PCT No.: PCT/CN2019/075635
§ 371 (c)(1),
(2) Date: Jul. 4, 2019

(65) Prior Publication Data
US 2020/0209663 A1    Jul. 2, 2020

(30) Foreign Application Priority Data
Dec. 26, 2018 (CN) .......................... 2018 1 1604177

(51) Int. Cl.
| G02F 1/1368 | (2006.01) |
| G02F 1/1334 | (2006.01) |
| G02F 1/1362 | (2006.01) |
| G02F 1/13357 | (2006.01) |
| G02F 1/1333 | (2006.01) |

(52) U.S. Cl.
CPC .......... *G02F 1/1368* (2013.01); *G02F 1/1334* (2013.01); *G02F 1/133602* (2013.01); *G02F 1/136209* (2013.01); *G02F 1/136227* (2013.01); *G02F 1/136286* (2013.01); *G02F 2001/133357* (2013.01); *G02F 2001/136222* (2013.01); *G02F 2201/121* (2013.01)

(58) Field of Classification Search
CPC ................. G02F 1/1368; G02F 1/1334; G02F 1/136227; G02F 1/136286; G02F 1/133602; G02F 1/136209; G02F 2001/136222; G02F 2001/133357; G02F 2201/121
USPC ...................................................... 349/88–94
See application file for complete search history.

(56) References Cited

U.S. PATENT DOCUMENTS

2016/0077390 A1* 3/2016 Sato ..................... G02F 1/1334
349/33

* cited by examiner

*Primary Examiner* — Charles S Chang
(74) *Attorney, Agent, or Firm* — Mark M. Friedman

(57) ABSTRACT

The present application provides an array substrate including an array layer, a first insulating layer, a second insulating layer, and a first indium tin oxide (ITO) layer. The array layer includes first thin film transistors and second thin film transistors, the first ITO layer electrically connected to the first thin film transistors, and a second ITO layer and a polymer dispersed liquid crystal layer are further disposed between the first insulating layer and the second insulating layer, the second ITO layer electrically connected to the second thin film transistors and electrically insulated from the first thin film transistors.

19 Claims, 4 Drawing Sheets

ARRAY SUBSTRATE, DISPLAY PANEL, AND METHOD OF CONTROLLING DISPLAY PANEL

BACKGROUND OF INVENTION

Field of Invention

The present invention relates to a field of electronic devices, and in particular, to an array substrate, a display panel, and a method of controlling a display panel.

Description of Prior Art

In the field of displays, high contrast has always been an object of research for researchers. At present, contrast is usually improved by increasing brightness. However, increasing brightness of a backlight module will increase power consumption of an entire display panel. Therefore, there is an urgent need to provide an array substrate, a display panel, and a method of controlling a display panel to improve the contrast of the display panel without increasing the brightness of the backlight module.

SUMMARY OF INVENTION

An embodiment of the present invention provides an array substrate, a display panel, and a method of controlling a display panel to improve the contrast of the display panel.

An array substrate is provides, including: a substrate layer; an array layer disposed on the substrate layer, wherein the array layer includes a plurality of first thin film transistors; a planarization layer disposed on the array layer; a first insulating layer disposed on the planarization layer; a metal layer disposed on the first insulating layer; a second insulating layer disposed on the first insulating layer; a common electrode layer disposed on the second insulating layer and electrically connected to the metal layer; a passivation layer disposed on the common electrode layer; and a first indium tin oxide (ITO) layer disposed on the passivation layer, the first ITO layer electrically connected to a first source and drain of the first thin film transistors; wherein the array layer further includes a plurality of second thin film transistors, and a second indium tin oxide (ITO) layer and a polymer dispersed liquid crystal layer are further disposed between the first insulating layer and the second insulating layer, and the second ITO layer is disposed on the first insulating layer, and the polymer dispersed liquid crystal layer is disposed on the second ITO layer, wherein the second ITO layer is electrically connected to second source and drain of the second thin film transistors, and electrically insulated from the first sources and drains of the first thin film transistors.

In the array substrate provided by an embodiment of the present invention, the array substrate further includes a light shielding layer disposed on the substrate layer, wherein the light shielding layer includes a plurality of light shielding portions disposed under the first sources and drains of the first thin film transistors and the second sources and drains of the second thin film transistors.

In the array substrate provided by an embodiment of the present invention, the array substrate includes a first via hole passing through the passivation layer, the common electrode layer, the second insulating layer, the first insulating layer, and a planarization layer, and the first via hole is located above the first sources and drains of the first thin film transistors.

In the array substrate provided by an embodiment of the present invention, the first ITO layer covers a surface of the passivation layer and a surface of the array substrate facing the first via hole, and the first ITO layer is electrically connected to the first sources and drains of the first thin film transistors by partially or completely filling the first via hole.

In the array substrate provided by an embodiment of the present invention, the array substrate includes a second via hole passing through the first insulating layer and the planarization layer, and the second via hole is located above the second sources and drains of the second thin film transistors.

In the array substrate provided by an embodiment of the present invention, the second ITO layer covers a portion of a surface of the first insulating layer and a surface of the array substrate facing the second via hole, and the second ITO layer is electrically connected to the second sources and drains of the second thin film transistors by partially or completely filling the second via hole.

In the array substrate provided by an embodiment of the present invention, the metal layer includes a plurality of metal lines above the first sources and drains of the first thin film transistors.

In the array substrate provided by an embodiment of the present invention, the polymer dispersed liquid crystal layer includes a polymer matrix and liquid crystal molecules dispersed in the polymer matrix.

A display panel is provided, including: a substrate layer; an array layer disposed on the substrate layer, wherein the array layer includes a plurality of first thin film transistors; a planarization layer disposed on the array layer; a first insulating layer disposed on the planarization layer; a metal layer disposed on the first insulating layer; a second insulating layer disposed on the first insulating layer; a common electrode layer disposed on the second insulating layer and electrically connected to the metal layer; a passivation layer disposed on the common electrode layer; and a first indium tin oxide (ITO) layer disposed on the passivation layer, the first ITO layer electrically connected to a first sources and drains of the first thin film transistors, wherein the array layer further includes a plurality of second thin film transistors, and a second indium tin oxide (ITO) layer and a polymer dispersed liquid crystal layer are further disposed between the first insulating layer and the second insulating layer, and the second ITO layer is disposed on the first insulating layer, and the polymer dispersed liquid crystal layer is disposed on the second ITO layer, wherein the second ITO layer is electrically connected to a second sources and drains of the second thin film transistors, and electrically insulated from the first sources and drains of the first thin film transistors;

a color filter substrate disposed on a side of the array substrate away from the substrate layer; and a liquid crystal portion disposed between the array substrate and the color filter substrate, wherein the liquid crystal portion includes a plurality of liquid crystal cells, and the polymer dispersed liquid crystal layer includes a plurality of polymer dispersed liquid crystal cells, wherein each of the liquid crystal cells corresponds to and covers one of the polymer dispersed liquid crystal cells, and one of the liquid crystal cells and one of the polymer-dispersed liquid crystal cells corresponding thereto.

In the display panel provided by an embodiment of the present invention, the array substrate further includes a light shielding layer disposed on the substrate layer, wherein the light shielding layer includes a plurality of light shielding portions disposed under the first sources and drains of the first thin film transistors and the second sources and drains of the second thin film transistors.

In the display panel provided by an embodiment of the present invention, the array substrate includes a first via hole passing through the passivation layer, the common electrode layer, the second insulating layer, the first insulating layer, and a planarization layer, and the first via hole.

In the display panel provided by an embodiment of the present invention, the first ITO layer covers a surface of the passivation layer and the array substrate and a surface of the array substrate facing the first via hole, and the first ITO layer is electrically connected to the first sources and drains of the first thin film transistors by partially or completely filling the first via hole.

In the display panel provided by an embodiment of the present invention, the array substrate includes a second via hole passing through the first insulating layer and the planarization layer, and the second via hole is located above the second sources and drains of the second thin film transistors.

In the display panel provided by an embodiment of the present invention, the second ITO layer covers a portion of a surface of the first insulating layer and a surface of the array substrate facing the second via hole, and the second ITO layer is electrically connected to the second sources and drains of the second thin film transistors by partially or completely filling the second via hole.

In the display panel provided by an embodiment of the present invention, the metal layer includes a plurality of metal lines above the first sources and drains of the first thin film transistors.

In the display panel provided by an embodiment of the present invention, the polymer dispersed liquid crystal layer includes a polymer matrix and liquid crystal molecules dispersed in the polymer matrix.

In the display panel provided by an embodiment of the present invention, the color filter substrate further includes a third indium tin oxide (ITO) layer, the third ITO layer facing towards the liquid crystal portion.

In the display panel provided by an embodiment of the present invention, the display panel further includes a backlight module disposed on a side of the array substrate away from the color filter substrate.

A method of controlling a display panel is provided, including: providing the above-described display panel, wherein the color filter substrate further includes a third indium tin oxide (ITO) layer, the third ITO layer facing towards the liquid crystal portion; turning on the first thin film transistors and the second thin film transistors corresponding to the sub-pixels when any of the sub-pixels needs to be displayed in high brightness; turning on the first thin film transistors corresponding to the sub-pixels while turning off the second thin film transistors corresponding to the sub-pixels when any of the sub-pixels needs to be displayed in a low brightness; and turning off the first thin film transistors and the second thin film transistors corresponding to the sub-pixels when any of the sub-pixels needs to be displayed in a dark state.

The present invention provides an array substrate, a display panel, and a method of controlling a display panel. The array substrate includes a substrate layer, an array layer, a planarization layer, a first insulating layer, a metal layer, a second insulating layer, a common electrode layer, a passivation layer, and a first indium tin oxide (ITO) layer, wherein the array layer includes a plurality of first thin film transistors and a plurality of second thin film transistors, the first ITO layer electrically connected to a first sources and drains of the first thin film transistors, and a second indium tin oxide (ITO) layer and a polymer dispersed liquid crystal layer are further disposed between the first insulating layer and the second insulating layer, the second ITO layer electrically connected to the second sources and drains of the second thin film transistors and electrically insulated from the first sources and drains of the first thin film transistors. The display panel includes the array substrate, a color filter substrate, and a liquid crystal portion, and the color filter substrate further includes a third indium tin oxide (ITO) layer, the third ITO layer facing towards the liquid crystal portion. When any of the sub-pixels needs to be displayed in high brightness, the first thin film transistors and the second thin film transistors corresponding to the sub-pixels are turned on. When any of the sub-pixels needs to be displayed in a low brightness, the first thin film transistors corresponding to the sub-pixels are turned on while the second thin film transistors corresponding to the sub-pixels are turned off. When any of the sub-pixels needs to be displayed in a dark state, the first thin film transistors and the second thin film transistors corresponding to the sub-pixels are turned off. As such, each sub-pixel has three display modes: high brightness, low brightness, and dark state. Therefore, the contrast of the display panel is improved without increasing the brightness of the backlight module, that is, without increasing the power consumption of the backlight module.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
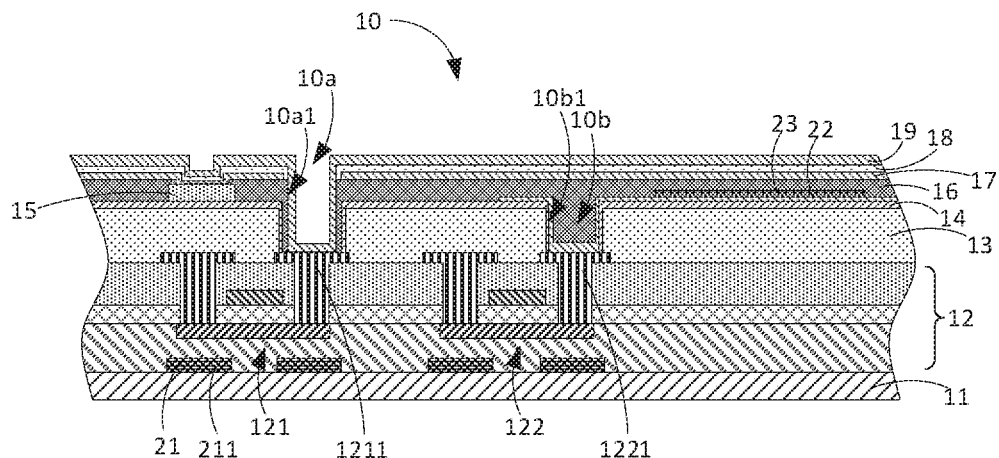
FIG. 1 is a schematic structural view of an array substrate provided by a first embodiment of the present invention.

Referring to FIG. 1, the present invention provides an array substrate 10. The array substrate 10 includes a substrate layer 11, an array layer 12, a planarization layer 13, a first insulating layer 14, a metal layer 15, a second insulating layer 16, a common electrode layer 17, a passivation layer 18, and a first indium tin oxide (ITO) layer 19.

The substrate layer 11 may be a glass substrate or a substrate formed of an organic material. The array substrate 10 further includes a light shielding layer 21 disposed on the substrate layer 11. The light shielding layer 21 includes a plurality of light shielding portions 211. The array layer 12 is disposed on the substrate layer 11. The array layer 12 includes a plurality of first thin film transistors 121 and a plurality of second thin film transistors 122. Each of the first thin film transistors 121 has a first source and drain 1211. Each of the second thin film transistors 122 has a source and drain 1221. The light shielding layer 21 is located between the substrate layer 11 and the array layer 12. The light shielding portions 211 are located below the first sources and drains 1211 of the first thin film transistors 121 and the second sources and drains 1221 of the second thin film transistors 122.

The planarization layer 13 is disposed on the array layer 12. The first insulating layer 14 is disposed on the planarization layer 13. The metal layer 15 is disposed on the first insulating layer 14. The second insulating layer 16 is located on the first insulating layer 14. The second insulating layer 16 covers the first insulating layer 14 and the metal layer 15. The common electrode layer 17 is located on the second insulating layer 16 and is electrically connected to the metal layer 15. The metal layer 15 includes a plurality of metal lines 151. The metal lines 151 are located above the first sources and drains 1211 of the first thin film transistors 121 to reduce light shielding by the metal line 151. The metal lines 151 may be made of copper. The passivation layer 18 is disposed on the common electrode layer 17. The first indium tin oxide (ITO) layer 19 is located on the passivation layer 18 and is electrically connected to the first sources and drains 1211 of the first thin film transistors 121.

Figure 2:
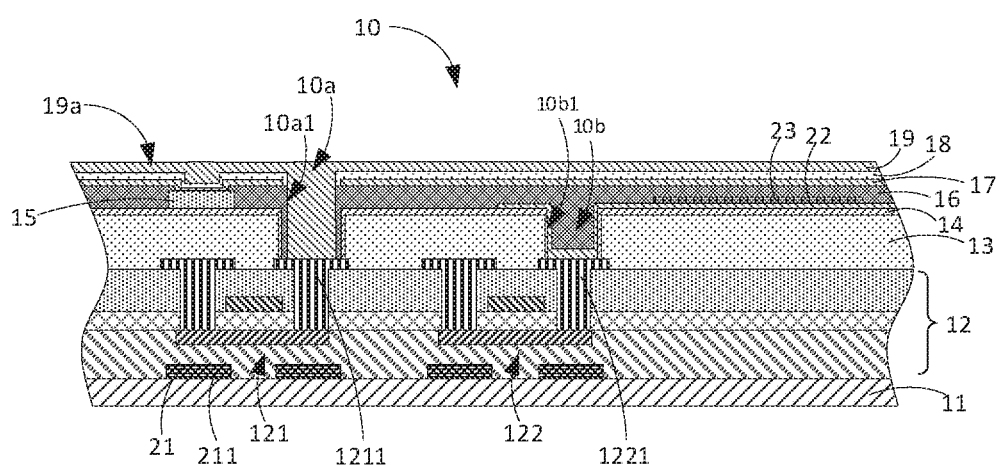
FIG. 2 is a schematic structural view of an array substrate provided by a second embodiment of the present invention.

The array substrate 10 includes a plurality of first via holes 10a. Each of the first via holes 10a passes through the passivation layer 18, the common electrode layer 17, the second insulating layer 16, the first insulating layer 14, and the planarization layer 13. Each of the first via holes 10a is located above the first sources and drains 1211 of the first thin film transistors 121. The first ITO layer 19 covers a surface 18a of the passivation layer 18 and a surface 10a of the array substrate 10 facing the first via hole 10a. The first ITO layer 19 is electrically connected to the first sources and drains 1211 of the first thin film transistors 121 by partially or completely filling the first via hole 10a. Referring to FIG. 1, the first ITO layer 19 is partially filled in the first via hole 10a to electrically connect the first sources and drains 1211 of the first thin film transistors 121. Referring to FIG. 2, the first ITO layer 19 completely fills the first via hole 10a to electrically connect the first sources and drains 1211 of the first thin film transistors 121. The upper surface 19a of the first ITO layer 19 is a flat surface.

Figure 3:
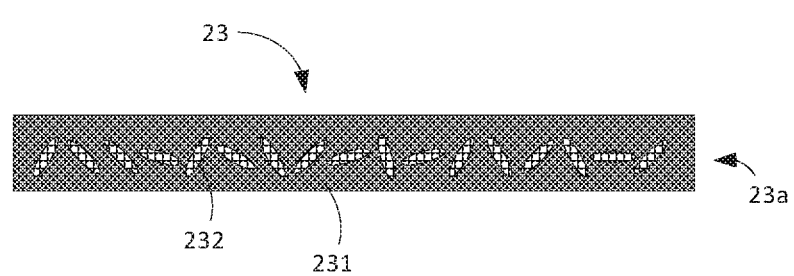
FIG. 3 is a schematic structural view of a polymer dispersed liquid crystal cells of a polymer dispersed liquid crystal layer of an array substrate provided by the present invention.

A second indium tin oxide (ITO) layer 22 and a polymer dispersed liquid crystal layer 23 are further disposed between the first insulating layer 14 and the second insulating layer 16. The second ITO layer 22 is disposed on the first insulating layer 14. The polymer dispersed liquid crystal layer 23 is disposed on the second ITO layer 22. The second ITO layer 22 is electrically connected to the second sources and drains 1221 of the second thin film transistor 122 and electrically insulated from the first sources and drains 1211 of the first thin film transistors 121. Referring to FIG. 3, the polymer dispersed liquid crystal layer 23 includes a polymer matrix 231 and liquid crystal molecules 232 dispersed in the polymer matrix 231. In the preparation process, a precursor of the polymer matrix 231 may be provided first, and then the liquid crystal molecules 232 are dispersed in the precursor, and then the precursor containing the liquid crystal molecules is disposed on the second ITO layer 22 by spraying or inkjet printing or the like to form the polymer dispersed liquid crystal layer 23.

The array substrate 10 includes a second via hole Mb. The second via hole 10b passes through the first insulating layer 14 and the planarization layer 13. The second via hole 10b is located above the second sources and drains 1221 of the second thin film transistors 122. The second ITO layer 22 covers a portion of a surface 14a of the first insulating layer 14 and a surface 10b1 of the array substrate 10 facing the second via hole 10b, and the second ITO layer 22 is partially or completely filled. The second via hole 10b is electrically connected to the second source drain 1221 of the second thin film transistors 122.

Figure 4:
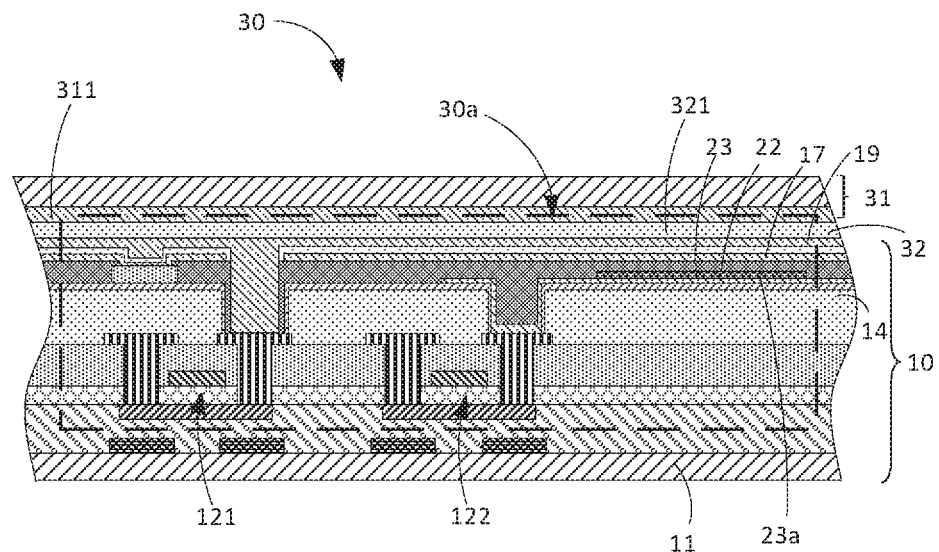
FIG. 4 is a schematic structural view of a display panel provided by the first embodiment of the present invention.
Figure 5:
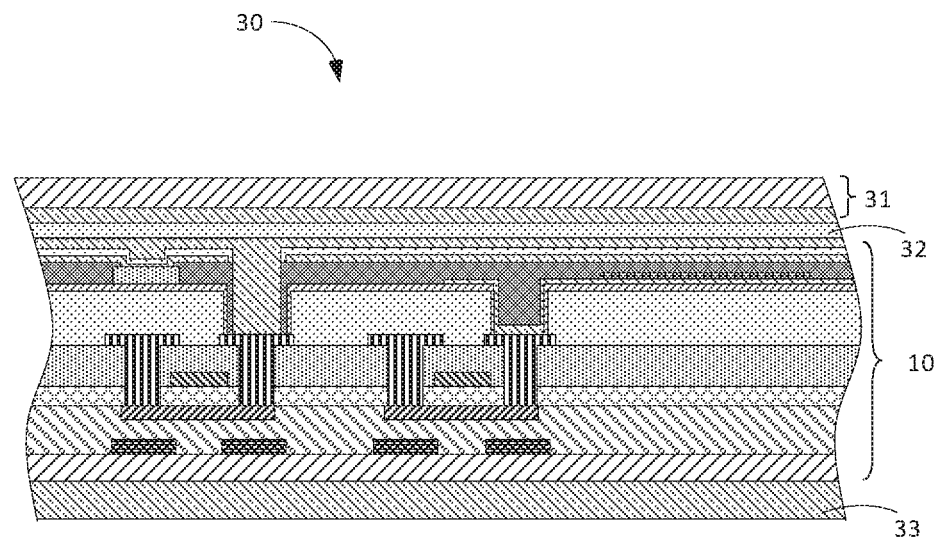
FIG. 5 is a schematic structural diagram of a display panel provided by the second embodiment of the present invention.

Referring to FIG. 4, the present invention also provides a display panel 30. The display panel 30 includes the array substrate 10 as described above, and further includes a color filter substrate 31 and a liquid crystal portion 32. The color filter substrate 31 is located on a side of the array substrate 10 away from the substrate layer 11. The liquid crystal portion 32 is located between the array substrate 10 and the color filter substrate 31. Referring to FIG. 5, the liquid crystal portion 32 includes a plurality of liquid crystal cells 321. Referring to FIG. 3, the polymer dispersed liquid crystal layer 23 includes a plurality of polymer dispersed liquid crystal cells 23a. Each of the liquid crystal cells 321 corresponds to and covers one of the polymer dispersed liquid crystal cells 23a. One of the liquid crystal cells 321 and one of the polymer-dispersed liquid crystal cells 23a corresponding thereto correspond to a sub-pixel 30a.

The color filter substrate 31 further includes a third indium tin oxide (ITO) layer 311. The third ITO layer 311 faces the liquid crystal portion 32. By turning on the first thin film transistors 121 to generate voltage between the first ITO layer 19 and the third ITO layer 311, directions of the liquid crystal molecules of the liquid crystal portion 32 are rotated, so that light can pass through the liquid crystal portion 32. By turning off the first thin film transistors 121 to eliminate voltage between the first ITO layer 19 and the third ITO layer 311, directions of the liquid crystal molecules of the liquid crystal portion 32 are restored, so that the liquid crystal portion 32 blocks light and prevents light from passing through the liquid crystal portion 32. By turning on the second thin film transistors 122 to generate voltage between the second ITO layer 22 and the common electrode layer 17, directions of the liquid crystal molecules of the polymer dispersed liquid crystal layer 23 are rotated, so that the light can pass through the polymer dispersed the liquid crystal layer 23. By turning off the second thin film transistors 122 to eliminate voltage between the second ITO layer 22 and the common electrode layer 17, directions of the liquid crystal molecules of the polymer dispersed liquid crystal layer 23 are restored, so that the polymer is dispersed. The liquid crystal layer 23 blocks light and prevents light from passing through the polymer dispersed liquid crystal layer 23.

Figure 6:
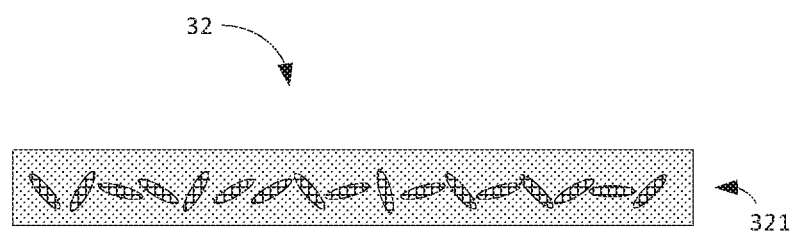
FIG. 6 is a schematic structural view of a liquid crystal cell of a liquid crystal portion of a display panel provided by the present invention.

Referring to FIG. 6, the display panel 30 may further include a backlight module 33. The backlight module 33 serves as a light source of the display panel 30. The backlight module 33 can be disposed on a side of the array substrate 10 away from the color filter substrate 31. The backlight module 33 can also be disposed on a side of the color filter substrate 31 away from the array substrate 10.

Figure 7:
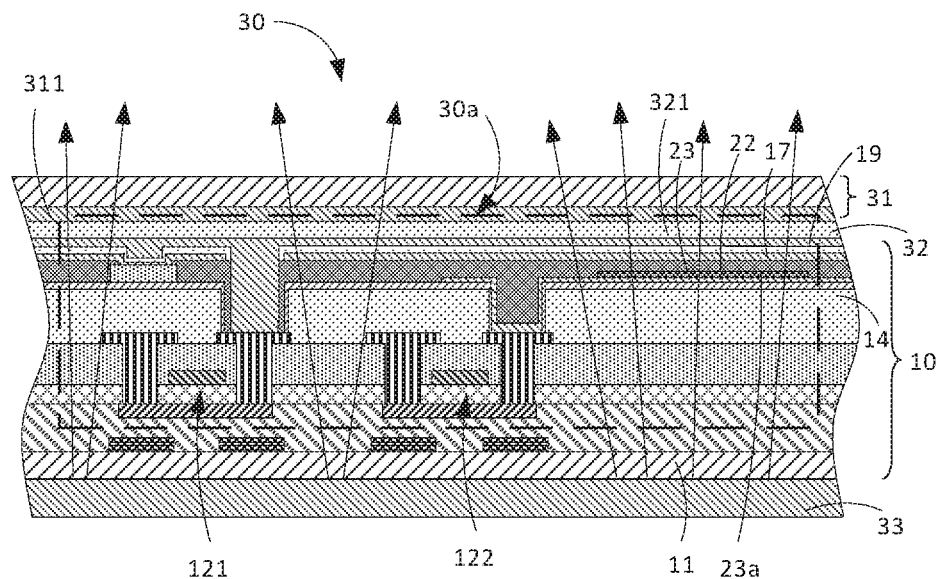
FIG. 7 is a schematic structural view of a display panel in a first use state according to the present invention.
Figure 8:
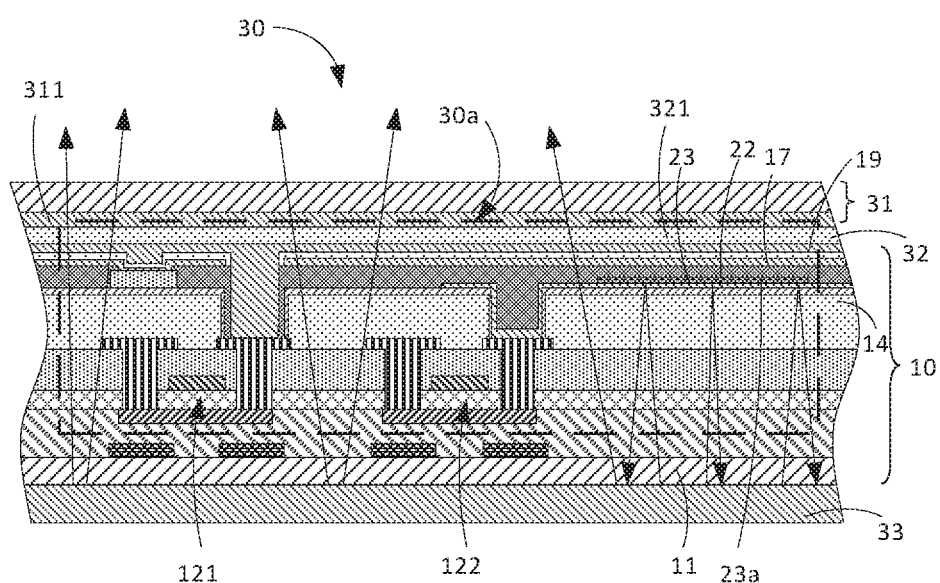
FIG. 8 is a schematic structural diagram of a display panel in a second use state according to the present invention.
Figure 9:
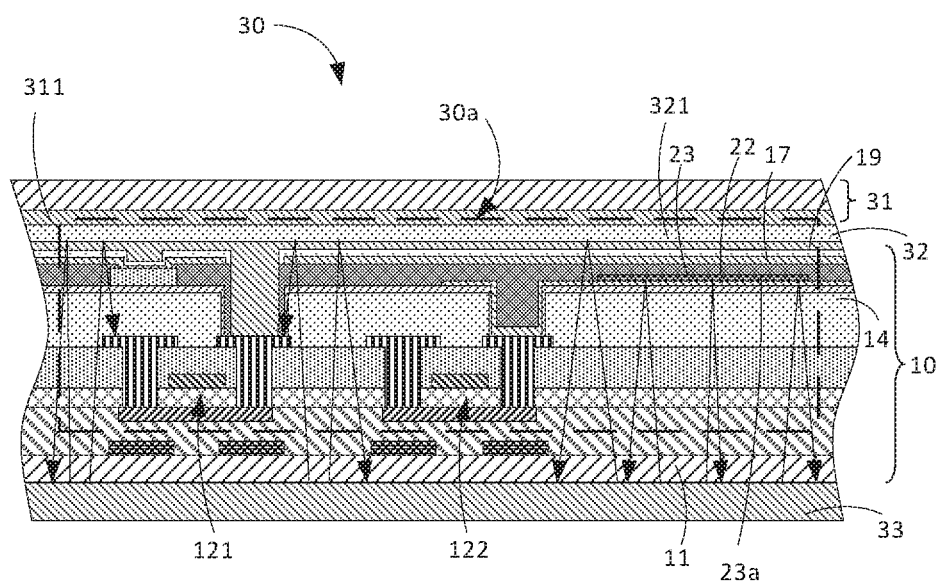
FIG. 9 is a schematic structural view of a display panel in a third use state according to the present invention.

Referring to FIGS. 7-9, the present invention also provides a method of controlling a display panel 30. The method includes:

A. providing a display panel 30.

The display panel 30 is as described above, and details are not repeated herein for brevity.

B. turning on the first thin film transistors 121 and the second thin film transistors 122 corresponding to the sub-pixels 30a when any of the sub-pixels needs to be displayed in high brightness.

Referring to FIG. 7, when any of the sub-pixels 30a needs to be displayed in a high brightness, the first thin film transistors 121 corresponding to the sub-pixels 30a are turned on, resulting in voltage generation between the first ITO layer 19 and the third ITO layer 311 to deflect the directions of the liquid crystal molecules of the liquid crystal portion 32 to transmit light. Meanwhile, the second thin film transistors 122 corresponding to the sub-pixels 30a are turned on, resulting in voltage generation between the second ITO layer 22 and the common electrode layer 17 to deflect the directions of the liquid crystal molecules of the liquid crystal portion 32 to transmit light.

C. turning on the first thin film transistors corresponding to the sub-pixels while turning off the second thin film transistors corresponding to the sub-pixels when any of the sub-pixels needs to be displayed in low brightness.

Referring to FIG. 8, when any of the sub-pixels 30a needs to be displayed in a low brightness, the first thin film transistors 121 corresponding to the sub-pixels 30a are turned on, resulting in voltage generation between the first ITO layer 19 and the third ITO layer 311 to deflect the directions of the liquid crystal molecules of the liquid crystal portion 32 to transmit light, while the second thin film transistors 122 corresponding to the sub-pixels 30a are turned off, resulting in voltage elimination between the second ITO layer 22 and the common electrode layer 17 to restore the directions of the liquid crystal molecules of the liquid crystal portion 32 to shield light.

D. turning off the first thin film transistors and the second thin film transistors corresponding to the sub-pixels when any of the sub-pixels needs to be displayed in a dark state.

Referring to FIG. 9, when any of the sub-pixels 30a needs to be displayed in a dark state, the first thin film transistors 121 corresponding to the sub-pixels 30a are turned off, resulting in voltage elimination between the first ITO layer 19 and the third ITO layer 311 to restore the directions of the liquid crystal molecules of the liquid crystal portion 32 to shield light. Meanwhile, the second thin film transistors 122 corresponding to the sub-pixels 30a are turned off, resulting in voltage elimination between the second ITO layer 22 and the common electrode layer 17 to restore the directions of the liquid crystal molecules of the liquid crystal portion 32 to shield light.

The present invention provides an array substrate, a display panel, and a method of controlling the display panel. The array substrate includes a substrate layer, an array layer, a planarization layer, a first insulating layer, a metal layer, a second insulating layer, a common electrode layer, a passivation layer, and a first indium tin oxide (ITO) layer, wherein the array layer includes a plurality of first thin film transistors and a plurality of second thin film transistors, the first no layer electrically connected to a first sources and drains of the first thin film transistors, and a second indium tin oxide (ITO) layer and a polymer dispersed liquid crystal layer are further disposed between the first insulating layer and the second insulating layer, the second ITO layer electrically connected to the second sources and drains of the second thin film transistors and electrically insulated from the first sources and drains of the first thin film transistors. The display panel includes the array substrate, a color filter substrate, and a liquid crystal portion, and the color filter substrate further includes a third indium tin oxide (ITO) layer, the third ITO layer facing towards the liquid crystal portion. When any of the sub-pixels needs to be displayed in high brightness, the first thin film transistors and the second thin film transistors corresponding to the sub-pixels are turned on. When any of the sub-pixels needs to be displayed in low brightness, the first thin film transistors corresponding to the sub-pixels are turned on while the second thin film transistors corresponding to the sub-pixels are turned off. When any of the sub-pixels needs to be displayed in a dark state, the first thin film transistors and the second thin film transistors corresponding to the sub-pixels are turned off. As such, each of the sub-pixels has three display modes: high brightness, low brightness, and dark state. Therefore, the contrast of the display panel is improved without increasing the brightness of the backlight module, that is, without increasing the power consumption of the backlight module.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed, is:

1. An array substrate, comprising:
   a substrate layer;
   an array layer disposed on the substrate layer, wherein the array layer comprises a plurality of first thin film transistors;
   a planarization layer disposed on the array layer;
   a first insulating layer disposed on the planarization layer;
   a metal layer disposed on the first insulating layer;
   a second insulating layer disposed on the first insulating layer;
   a common electrode layer disposed on the second insulating layer and electrically connected to the metal layer;
   a passivation layer disposed on the common electrode layer; and
   a first indium tin oxide (ITO) layer disposed on the passivation layer, the first ITO layer electrically connected to a first source and drain of the first thin film transistors;
   wherein the array layer further comprises a plurality of second thin film transistors, and a second indium tin oxide (ITO) layer and a polymer dispersed liquid, crystal layer are further disposed between the first insulating layer and the second insulating layer, and the second ITO layer is disposed on the first insulating layer, and the polymer dispersed liquid crystal layer is disposed on the second ITO layer, wherein the second ITO layer is electrically connected to second source and drain of the second thin film transistors, and electrically insulated from the first sources and drains of the first thin film transistors.

2. The array substrate of claim 1, wherein the array substrate further comprises a light shielding layer disposed on the substrate layer, wherein the light shielding layer comprises a plurality of light shielding portions disposed under the first sources and drains of the first thin film transistors and the second sources and drains of the second thin film transistors.

3. The array substrate according to claim 1, wherein the array substrate comprises a first via hole passing through the passivation layer, the common electrode layer, the second insulating layer, the first insulating layer, and the planarization layer, and the first via hole is located above the first sources and drains of the first thin film transistors.

4. The array substrate according to claim 3, wherein the first ITO layer covers a surface of the passivation layer and a surface of the array substrate facing the first via hole, and the first ITO layer is electrically connected to the first sources and drains of the first thin film transistors by partially or completely filling the first via hole.

5. The array substrate according to claim 1, wherein the array substrate comprises a second via hole passing through the first insulating layer and the planarization layer, and the second via hole is located above the second sources and drains of the second thin film transistors.

6. The array substrate according to claim 5, wherein the second ITO layer covers a portion of a surface of the first insulating layer and a surface of the array substrate facing the second via hole, and the second ITO layer is electrically connected to the second sources and drains of the second thin film transistors by partially or completely filling the second via hole.

7. The array substrate of claim 1, wherein the metal layer comprises a plurality of metal lines above the first sources and drains of the first thin film transistors.

8. The array substrate according to claim 1, wherein the polymer dispersed liquid crystal layer comprises a polymer matrix and liquid crystal molecules dispersed in the polymer matrix.

9. A display panel, comprising:
a substrate layer;
an array layer disposed on the substrate layer, wherein the array layer comprises a plurality of first thin film transistors;
a planarization layer disposed on the array layer;
a first insulating layer disposed on the planarization layer;
a metal layer disposed on the first insulating layer;
a second insulating layer disposed on the first insulating layer;
a common electrode layer disposed on the second insulating layer and electrically connected to the metal layer;
a passivation layer disposed on the common electrode layer; and
a first indium tin oxide (ITO) layer disposed on the passivation layer, the first ITO layer electrically connected to a first sources and drains of the first thin film transistors,
wherein the array layer further comprises a plurality of second thin film transistors, and a second indium tin oxide (ITO) layer and a polymer dispersed liquid crystal layer are further disposed between the first insulating layer and the second insulating layer, and the second ITO layer is disposed on the first insulating layer, and the polymer dispersed liquid crystal layer is disposed on the second ITO layer, wherein the second ITO layer is electrically connected to a second sources and drains of the second thin film transistors, and electrically insulated from the first sources and drains of the first thin film transistors;
a color filter substrate disposed on a side of the array substrate away from the substrate layer; and a liquid crystal portion disposed between the array substrate and the color filter substrate, wherein the liquid crystal portion comprises a plurality of liquid crystal cells, and the polymer dispersed liquid crystal layer comprises a plurality of polymer dispersed liquid crystal cells, wherein each of the liquid crystal cells corresponds to and covers one of the polymer dispersed liquid crystal cells, and one of the liquid crystal cells and one of the polymer-dispersed liquid crystal cells corresponding thereto correspond to a sub-pixel.

10. The display panel of claim 9, wherein the array substrate further comprises a light shielding layer disposed on the substrate layer, wherein the light shielding layer comprises a plurality of light shielding portions disposed under the first sources and drains of the first thin film transistors and the second sources and drains of the second thin film transistors.

11. The display panel of claim 9, wherein the array substrate comprises a first via hole passing through the passivation layer, the common electrode layer, the second insulating layer, the first insulating layer, and a planarization layer, and the first via hole.

12. The display panel of claim 9, wherein the first ITO layer covers a surface of the passivation layer and the array substrate and a surface of the array substrate facing the first via hole, and the first ITO layer is electrically connected to the first sources and drains of the first thin film transistors by partially or completely filling the first via hole.

13. The display panel of claim 9, wherein the array substrate comprises a second via hole passing through the first insulating layer and the planarization layer, and the second via hole is located above the second sources and drains of the second thin film transistors.

14. The display panel of claim 13, wherein the second ITO layer covers a portion of a surface of the first insulating layer and a surface of the array substrate facing the second via hole, and the second ITO layer is electrically connected to the second sources and drains of the second thin film transistors by partially or completely filling the second via hole.

15. The display panel of claim 9, wherein the metal layer comprises a plurality of metal lines above the first sources and drains of the first thin film transistors.

16. The display panel of claim 9, wherein the polymer dispersed liquid crystal layer comprises a polymer matrix and liquid crystal molecules dispersed in the polymer matrix.

17. The display panel of claim 9, wherein the color filter substrate further comprises a third indium tin oxide (ITO) layer, the third ITO layer facing towards the liquid crystal portion.

18. The display panel of claim 9, wherein the display panel further comprises a backlight module disposed on a side of the array substrate away from the color filter substrate.

19. A method of controlling a display panel, comprising:
providing the display panel according to claim 9, wherein a color filter substrate further comprises a third indium tin oxide (ITO) layer, the third ITO layer facing towards a liquid crystal portion;
turning on first thin film transistors and second thin film transistors corresponding to sub-pixels when any of the sub-pixels needs to be displayed in high brightness;
turning on the first thin film transistors corresponding to the sub-pixels while turning off the second thin film transistors corresponding to the sub-pixels when any of the sub-pixels needs to be displayed in low brightness; and turning off the first thin film transistors and the second thin film transistors corresponding to the sub-pixels when any of the sub-pixels needs to be displayed in a dark state.

\* \* \* \* \*